Oct. 26, 1948.                V. J. HUSTON ET AL                2,452,124
                                HYDRAULIC SCALE
Filed April 2, 1946                                          2 Sheets-Sheet 1
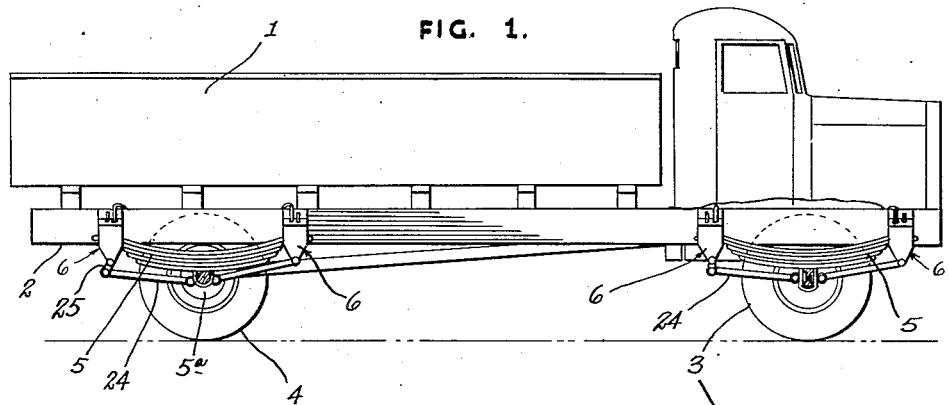
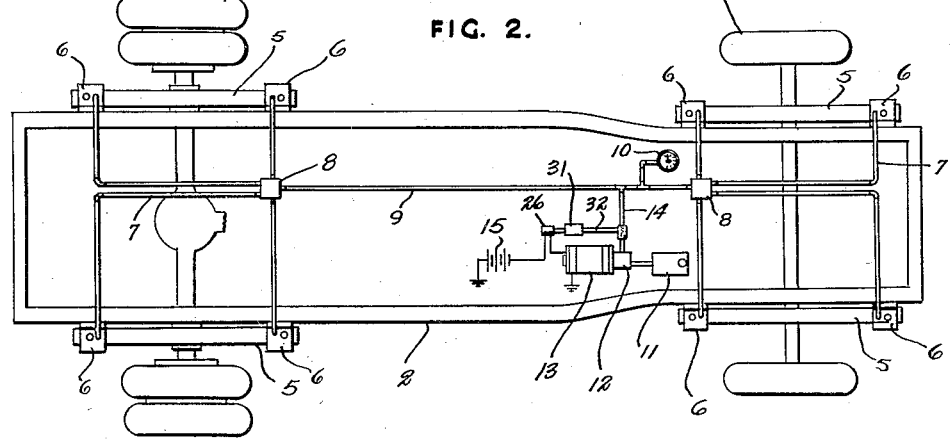
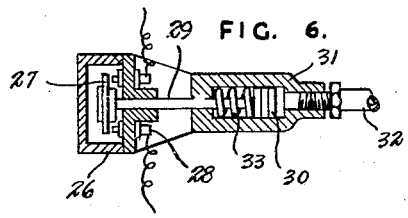
Inventor
VICTOR J. HUSTON, AND
FRANK G. HUSTON,

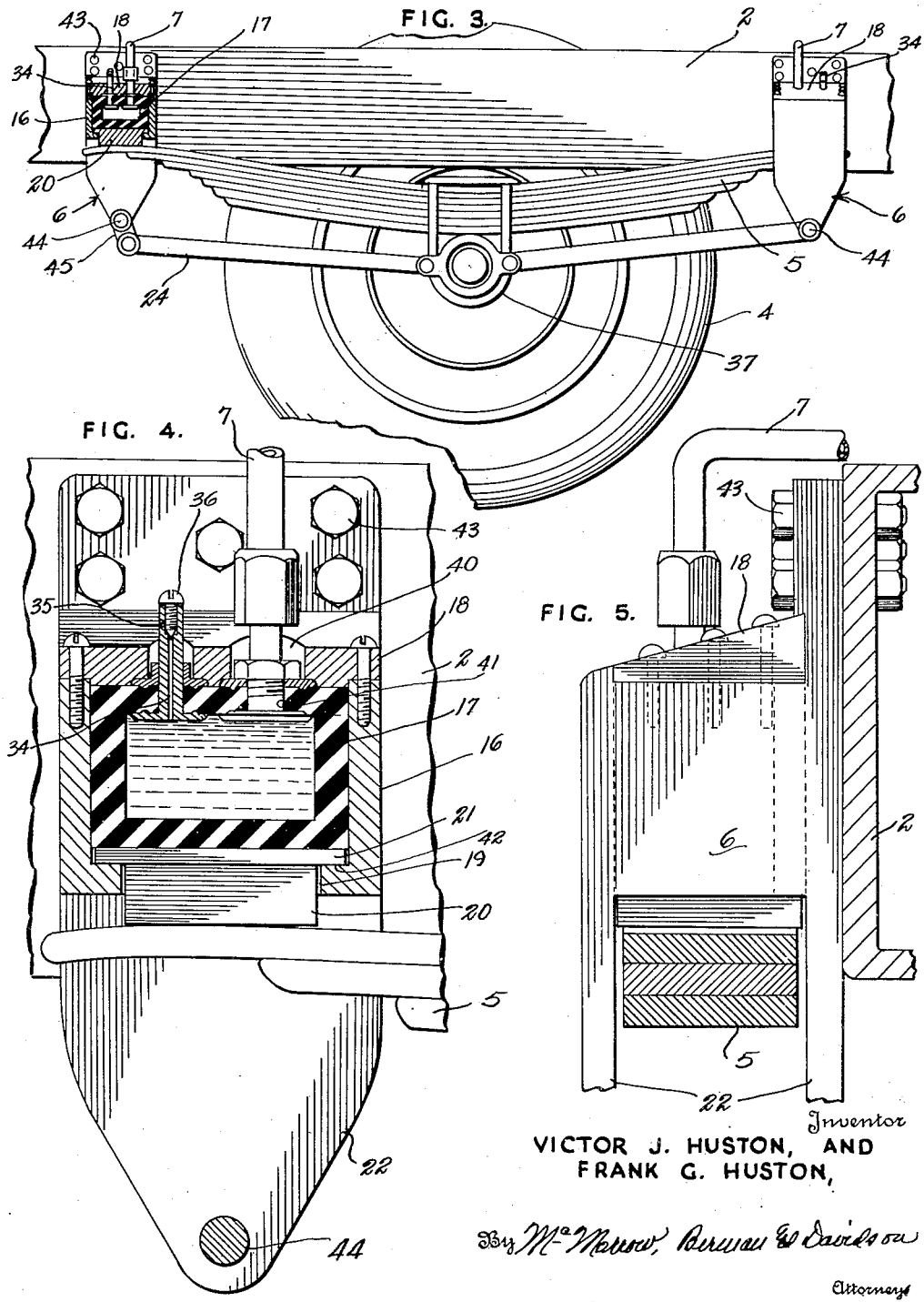

Patented Oct. 26, 1948

2,452,124

UNITED STATES PATENT OFFICE 2,452,124

HYDRAULIC SCALE

Victor J. Huston and Frank G. Huston,
Muskegon, Mich.

Application April 2, 1946, Serial No. 659,103

3 Claims. (Cl. 265—40)

This invention relates to load-weighing apparatus for trucks, and other motor vehicles, and especially to such weighing apparatus designed to be incorporated with the truck itself, so that the body and contents of the truck can be weighed anywhere without resort to stationary weighing scales at loading points or checking stations upon the public highways.

An object of the invention is to provide a load-weighing apparatus of simple and efficient construction adapted to be mounted on a motor vehicle between the wheels and the chassis supporting the body, and capable of quick and easy operation so that the driver can at all times ascertain the weight of the cargo he is carrying. A great deal of time ordinarily required to be spent at a weighing station is thus saved and the task of receiving, transporting and delivering freight is expedited.

The invention is shown in its preferred form upon the accompanying drawings, and the novel features are defined in the appended claims, but the description is explanatory only, and we may make changes in various details without departing from the principle of the invention.

On the drawings:

Figure 1 is a side view of the truck having the load-weighing apparatus of the present invention mounted thereon.

Figure 2 is a plan view showing the manner in which the load-weighing apparatus of the invention is applied to a truck or other motor vehicle.

Figure 3 is an enlarged side view, partly in section, of the rear end of the motor vehicle having the load-weighing apparatus attached, showing more fully the method of mounting the essential parts thereof.

Figure 4 is an enlarged front view, partly in section, showing a weight-responsive unit which is an essential part of the invention.

Figure 5 is an enlarged side view of the weight-responsive unit.

Figure 6 is an enlarged sectional view of motor circuit breaker mechanism.

The same numerals identify the same parts throughout.

In the drawings the numeral 1 indicates the body of a truck which is mounted upon the chassis 2. At 3 are the front wheels and at 4 are the rear wheels, either or both of which may be connected to the engine to propel the truck. Between the axles of the wheels and the chassis are suitable springs 5. In its practical form my invention comprises several load-responsive units 6, two of which are associated with each spring 5, and disposed between the ends of the springs and the chassis 2. With one of these units over the adjacent end of each spring, the weight of the chassis and the body above the chassis is exerted directly upon these units.

Each of the load-responsive units 6 is filled with any suitable virtually incompressible fluid medium. The units are all connected by means of conduits or tubings 7 to suitable means for keeping the units and the tubings filled.

The four units 6 adjacent the rear of the truck, one over each end of the two springs 5 for the rear wheels 4 are joined by tubing to a junction 8. The remaining four units adjacent the front of the truck over the springs for the wheels 3 are similarly connected to a junction 8, and these two junctions 8 are united by a length of tubing 9. Connected to this length of tubing 9 is a weight indicator 10, this indicator being of the usual type comprising a dial or face with graduations thereon and a pivoted index member or pointer which moves over the graduations to give a reading.

Carried in any convenient place on the truck and containing the fluid incompressible medium is a reservoir 11 to which is connected a pump 12, said pump being connected to the tubing 9 by means of tubing or line 14. Operatively connected to the pump 1 is a motor 13 which is electrically connected to a battery 15, said battery being of the type commonly employed for the purpose of starting the engine. Of course, any other suitable mechanism for actuating the pump 12 may be used.

As the structure of each of the units 6 is the same, only one unit will be specifically described. The unit 6 comprises a strong outer casing 16, within which is mounted a resilient container 17 adapted to receive and hold a portion of the incompressible fluid medium, the casing 16 and the container 17 being of any suitable shape. The casing 16 is provided with an opening at its top so as to permit the resilient container 17 to be inserted or withdrawn as desired. The opening in the top of the casing is closed by a detachably mounted cover plate 18 which is held securely in place by screws or other like means. The cover plate is provided with an opening 40 through which extends an end of the tube 7, said end passing through a complemental opening 41 in the container 17. As shown in Figure 4, the tube 7 is connected to the container 17 by means of suitable fittings.

The casing 16 is provided with an opening 19 in its bottom thereof, through which projects a head 20. As shown in Figure 4, the head 20 has a flange 21 which is positioned intermediate the bottom of the resilient container 17 and the shoulder 42 formed in the bottom of the casing 16. The head 20 and its flange 21 are so formed as to provide for slidable movement within the opening 19 and casing 16. The lower end of the head 20 rests upon and is supported by the upper surface of the top leaf of the spring 5 adjacent its end. Thus, the head 20 may be reciprocated within limits under the compressive and expansive action of the resilient container 17.

The top of the unit 6 is attached to the chassis 2 of the vehicle, as at 43, and the bottom of each unit is apertured to receive a transverse pin 44 by means of which the outer ends of a pair of links or tow bars 24 are secured to the units, the inner ends of these links being pivoted to the axle of the vehicle by means of a pair of supporting members 22. A set of links is connected between the frame and each axle adjacent each spring to restrain the axles against forward and rearward movement relative to the frame. As clearly shown in Figure 3, the unit 6 to the rear end of the spring 5 is connected to the shackle 45, while the unit 6 to the forward end of such spring is directly connected to the ends of the pair of link bars by means of pins 44.

The flexible container 17 is provided with a bleeder valve, Figure 4, which comprises a pipe section having an opening 34 therethrough, said opening being in communication with a transverse opening 35. The top of said pipe section is closed by means of a threaded screw 36, said screw being provided with a pointed end.

The pump 12 and motor 13 constitute a convenient filling means for impelling the incompressible fluid from the reservoir 11 into the tube 7 and unit 6. A circuit breaker-actuating mechanism is provided for controlling the filling means and rendering same inoperative under predetermined conditions, such mechanism comprising a casing 26 having a movable contact conductor 27 which bridges a pair of fixed contacts 28 in series with the motor 13 and battery 15. The movable contact conductor 27 has a stem 29 which projects outside of the casing 26 and terminates in a piston 30 in a cylinder 31. This cylinder is connected by a piece of tubing 32 with a tubing 14. In the cylinder 31 a spring 33 engages the piston 30 and tends to move the conductor 27 into position against the fixed conductor 28. When, however, the pressure in the tubing 9 and the other tube and unit 6 is high enough, the piston 30 will be moved against the spring 33 to move the conductor 27 out of contact with the fixed conductor 28.

To use the apparatus, the truck is first weighed when it is entirely empty. The motor 13 and pump 12 are started and enough fluid is impelled into the tubing and the resilient container 17 to inflate the latter. The weight of the truck and the chassis is now exerted through the eight units 6 and the resilient containers therein upon the two ends of each of the four springs 5. The indicator 10 is so designed that when this condition is reached, the index of the instrument 10 will give a reading of zero. The motor circuit breaker mechanism is so constructed that it will act to open the motor circuit and stop the motor and pump as soon as the resilient containers 17 are substantially filled, and the weight of the truck, that is to say, the chassis and body, is effectively borne thereby. The system is then substantially filled and the motor will not again operate until the liquid contained in the apparatus has been diminished and requires replenishment.

When the truck is then filled in whole or in part, the articles which are stored in the body 1 will, of course, add to the weight of the truck, or rather, the weight of the body and chassis.

This weight causes the ends of the springs to flex downwardly, resulting in the movement upwardly of the head 20 and its flange 21, the flange in turn acting to press against the bottom of the resilient containers 17 to thereby compress the said container. As the weight increases, so does the compressive pressure upon the resilient container correspondingly increase. This compressive pressure will be transmitted through the tubing 7, union 8, and tubing 9, to the indicator 10.

The higher reading now given by the indicator will represent the exact weight of the contents of the truck. An accurate reading will be given because, even if the contents of the body 1 are not evenly distributed, the effect of the compression of the fluid in the apparatus will nevertheless be uniform and a true reading on the face of the indicator 10 will be the result.

It can thus be seen that our invention can be embodied in a very simple and practical apparatus, which can be produced at comparatively little cost and quickly and easily installed on any motor vehicle of the kind described herein. It enables the truck and load to be weighed and re-weighed as often as is necessary; saves the time of the driver, which would ordinarily be consumed in stops at stationary scales to weigh the contents of the body of one of the trucks, and greatly accelerates the progress of freight in transit.

Having described our invention, what we claim is:

1. Load weighing apparatus for a vehicle having axles, a frame, springs supporting said frame on said axles, and means maintaining said frame against longitudinal movement relative to said axles, said apparatus comprising fluid-filled, compressible units secured to said frame, one at each end of each spring, and bearing upon said springs to transmit the load forces between said frame and said springs, each of said units including a flexible container, conduit means inter-connecting all of said flexible containers, means connected with said conduit means to maintain said containers filled with hydraulic fluid, and an indicator connected to said conduit means for indicating the load imposed on said springs.

2. Load weighing apparatus for a vehicle having axles, a frame, springs supporting said frame on said axles, and link means operatively connected between said frame and said axles to maintain said frame against longitudinal movement relative to said axles, said apparatus comprising fluid-filled, compressible units secured to said frame, one at each end of each spring, and bearing upon said springs to transmit load forces between said frame and said springs, each of said units comprising a strong, hollow casing secured to the frame and having an opening in its bottom end, a container of flexible material in said casing, and a head projecting through the bottom opening in said casing bearing at its upper side against the bottom of said container and at its lower side against the corresponding spring end, conduit means inter-connecting all of said containers, means connected with said conduit means to maintain said containers filled with hydraulic fluid, and an indicator connected to said conduit means for indicating the load imposed on said springs.

3. Load weighing apparatus for a vehicle having axles, a frame, springs supporting said frame on said axles, and link means operatively interconnected between said frame and said axles to maintain said frame against longitudinal movement relative to said axles, said apparatus comprising fluid-filled, compressible units secured to said frame, one at each end of each spring, and bearing upon said springs to transmit load forces between said frame and said springs, each of said units comprising a strong, hollow casing having in its bottom end an opening smaller than said bottom end to provide an internal shoulder around said opening, a hollow container of flexible material in said casing, and a head projecting through said bottom opening in the casing and having a flange bearing upon said shoulder to preclude movement of said head out of said casing, said head bearing at its upper side on the bottom of said hollow container and at its lower side against the corresponding spring end, conduit means inter-connecting all of said containers, means connected with said conduit means to maintain said containers filled with hydraulic fluid, and an indicator connected to said conduit means for indicating the load imposed on said springs.

VICTOR J. HUSTON.
FRANK G. HUSTON.

REFERENCES CITED

The following references are of record in the file of this patent:

UNITED STATES PATENTS

| Number | Name | Date |
| --- | --- | --- |
| 1,417,462 | Eason | May 23, 1922 |
| 1,766,782 | Goldman | June 24, 1930 |
| 2,020,307 | Fitch | Nov. 12, 1935 |
| 2,106,652 | Pinson | Jan. 25, 1938 |
| 2,109,460 | Brasher | Mar. 1, 1938 |
| 2,364,443 | Hornbostel | Dec. 5, 1944 |